US012574954B2

(12) United States Patent
Jiang et al.

(10) Patent No.: US 12,574,954 B2
(45) Date of Patent: Mar. 10, 2026

(54) RANDOM ACCESS METHOD AND APPARATUS, TERMINAL, AND NETWORK SIDE DEVICE

(71) Applicant: VIVO MOBILE COMMUNICATION CO., LTD., Dongguan (CN)

(72) Inventors: Dajie Jiang, Dongguan (CN); Zichao Ji, Dongguan (CN); Jin Liu, Dongguan (CN); Yongchun Bai, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 342 days.

(21) Appl. No.: 18/205,499

(22) Filed: Jun. 2, 2023

(65) Prior Publication Data

US 2023/0319894 A1     Oct. 5, 2023

Related U.S. Application Data

(63) Continuation of application No. PCT/CN2021/134966, filed on Dec. 2, 2021.

(30) Foreign Application Priority Data

Dec. 4, 2020    (CN) .......................... 202011417206.6

(51) Int. Cl.
 *H04W 74/08*     (2024.01)
 *H04L 5/00*      (2006.01)
        (Continued)

(52) U.S. Cl.
 CPC ......... *H04W 72/542* (2023.01); *H04L 5/0051* (2013.01); *H04W 74/0833* (2013.01); *H04W 74/0866* (2013.01); *H04W 74/0836* (2024.01)

(58) Field of Classification Search
 None
 See application file for complete search history.

(56) References Cited

U.S. PATENT DOCUMENTS

2020/0137800 A1     4/2020  Takahashi et al.
2020/0383149 A1*   12/2020  Rico Alvarino ...... H04L 5/0051
        (Continued)

FOREIGN PATENT DOCUMENTS

CN     108124290 A     6/2018
CN     110574408 A    12/2019
        (Continued)

OTHER PUBLICATIONS

International Search Report issued in corresponding International Application No. PCT/CN2021/134966, mailed Feb. 11, 2022, 4 pages.
        (Continued)

*Primary Examiner* — Steve R Young
(74) *Attorney, Agent, or Firm* — IPX PLLC

(57) ABSTRACT

A random access method and apparatus, a terminal, and a network side device are provided. The method includes: determining, by the terminal, a first signal related parameter based on terminal identifier related information. The method further includes sending, by the terminal, a first signal based on the first signal related parameter. The first signal includes at least one of a Sounding Reference Signal (SRS) or a preamble of a first random access message. The first signal related parameter includes at least one of the following: sequence identification information of the first signal; a time domain resource for the first signal; or a frequency domain resource for the first signal.

19 Claims, 4 Drawing Sheets

(51) Int. Cl.

| | |
|---|---|
| *H04W 72/542* | (2023.01) |
| *H04W 74/0833* | (2024.01) |
| *H04W 74/0836* | (2024.01) |

(56) References Cited

U.S. PATENT DOCUMENTS

| | | | | |
|---|---|---|---|---|
| 2021/0194734 A1* | 6/2021 | Herath | .............. | H04W 56/0005 |
| 2022/0046716 A1* | 2/2022 | Chai | ................... | H04W 72/046 |
| 2022/0124813 A1* | 4/2022 | Cao | ........................ | H04L 5/0048 |
| 2022/0191937 A1* | 6/2022 | Lei | ........................ | H04L 5/0044 |
| 2022/0264520 A1* | 8/2022 | Xu | ....................... | H04W 68/005 |
| 2022/0330345 A1* | 10/2022 | Mangalvedhe | ........ | H04B 7/022 |
| 2023/0007702 A1* | 1/2023 | Park | ................... | H04W 74/0833 |
| 2023/0180242 A1* | 6/2023 | Cirik | .................... | H04L 5/0023 |
| | | | | 370/329 |
| 2023/0300891 A1* | 9/2023 | Su | ........................ | H04W 74/002 |
| | | | | 370/329 |
| 2024/0040633 A1* | 2/2024 | Zhang | .............. | H04W 74/0841 |

FOREIGN PATENT DOCUMENTS

| | | | |
|---|---|---|---|
| CN | 110831227 | A | 2/2020 |
| CN | 110832942 | A | 2/2020 |
| CN | 111865388 | A | 10/2020 |
| WO | 2020172819 | A1 | 9/2020 |
| WO | 2020221318 | A1 | 11/2020 |

OTHER PUBLICATIONS

Intel Corporation, "Considerations of 2-step CBRA for NR Licensed and Unlicensed Operation", 3GPP TSG-RAN WG2 meeting #103 R2-1811664, Aug. 2018, 4 pages.

Extended European Search Report issued in related European Application No. 21900047.8, mailed Mar. 21, 2024, 8 pages.

First Office Action issued in related Chinese Application No. 202011417206.6, mailed Jul. 23, 2024, 7 pages.

NTT Docomo, "Revised Text proposal for ITU-R submission template"3GPP tsg_ran\WG1_RL1,TSGR1_56b, R1-091644, Mar. 2009, 44 pages.

\* cited by examiner

12

Network side device 11          11

Terminal

Terminal

Start

A terminal determines a first signal related parameter based on terminal
identifier related information

201

The terminal sends a first signal based on the first signal related parameter

202

End

RANDOM ACCESS METHOD AND APPARATUS, TERMINAL, AND NETWORK SIDE DEVICE

CROSS-REFERENCE TO RELATED APPLICATIONS

This application is a continuation of International Application No. PCT/CN2021/134966, filed on Dec. 2, 2021, which claims priority to Chinese Patent Application No. 202011417206.6, filed on Dec. 4, 2020. The entire contents of each of the above-referenced applications are expressly incorporated herein by reference.

TECHNICAL FIELD

The present application relates to the field of communication technologies, and in particular, to a random access method and apparatus, a terminal, and a network side device.

BACKGROUND

The cell free network system includes many Access Points (APs), a User Equipment (UE) communicates with one or more neighboring APs, and when the UE moves between APs, a serving AP of the UE changes. When a plurality of UEs send same information (such as a preamble) to a plurality of APs, the network side device cannot determine which UE or UEs the information received by the plurality of APs comes from, thus affecting communication between the network side and the terminal.

SUMMARY

Embodiments of this application provide a random access method and apparatus, a terminal, and a network side device.

According to a first aspect, a random access method is provided, including:

determining, by a terminal, a first signal related parameter based on terminal identifier related information; and sending, by the terminal, a first signal based on the first signal related parameter, where the first signal includes at least one of a Sounding Reference Signal (SRS) and a preamble of a first random access message; and the first signal related parameter includes at least one of the following:

sequence identification information of the first signal;

a time domain resource for the first signal; and a frequency domain resource for the first signal.

According to a second aspect, a random access method is provided, including:

receiving, by a network side device, a first signal, where a first signal related parameter is associated with terminal identifier related information, and the first signal includes at least one of an SRS and a preamble of a first random access message, where the first signal related parameter includes at least one of the following:

sequence identification information of the first signal;

a time domain resource for the first signal; and a frequency domain resource for the first signal.

According to a third aspect, a random access apparatus is provided, including:

a first determining module, configured to determine a first signal related parameter based on terminal identifier related information; and a first sending module, configured to send a first signal based on the first signal related parameter, where the first signal includes at least one of an SRS and a preamble of a first random access message; and the first signal related parameter includes at least one of the following:

sequence identification information of the first signal;

a time domain resource for the first signal; and a frequency domain resource for the first signal.

According to a fourth aspect, a random access apparatus is provided, including:

a second receiving module, configured to receive a first signal, where a first signal related parameter is associated with terminal identifier related information, and the first signal includes at least one of an SRS and a preamble of a first random access message, where the first signal related parameter includes at least one of the following:

sequence identification information of the first signal;

a time domain resource for the first signal; and a frequency domain resource for the first signal.

According to a fifth aspect, a terminal is provided, where the terminal includes a processor, a memory, and a program or an instruction stored in the memory and executable on the processor, where when the program or instruction is executed by the processor, steps of the method according to the first aspect are implemented.

According to a sixth aspect, a network side device is provided, where the network side device includes a processor, a memory, and a program or an instruction stored in the memory and executable on the processor, and when the program or the instruction is executed by the processor, steps of the method according to the second aspect are implemented.

According to a seventh aspect, a readable storage medium is provided, where the readable storage medium stores a program or an instruction, and when the program or the instruction is executed by a processor, steps of the method according to the first aspect or the second aspect are implemented.

According to an eighth aspect, a chip is provided, where the chip includes a processor and a communications interface, the communications interface is coupled to the processor, and the processor is configured to run a program or an instruction, to implement steps of the method according to the first aspect or the second aspect.

According to a ninth aspect, an embodiment of this application provides a program product, where the program product is stored in a non-volatile storage medium, and the program product is executed by at least one processor to implement steps of the method according to the first aspect or the second aspect.

According to a tenth aspect, an embodiment of this application provides a communications device, configured to perform steps of the method according to the first aspect or the second aspect.

In the embodiments of this application, the first signal sent by the terminal is associated with the terminal identification information, so that the network side device can determine the terminal corresponding to the received first signal, and then can accurately communicate with the corresponding terminal.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

Terms "first" and "second" in the specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. A New Radio (NR) system is described below for an illustration purpose, and the term NR is used in most of the descriptions, although these technologies can also be used in an application other than an NR system application, for example, a $6^{th}$ Generation (6G) communications system.

Figures 1, 2:
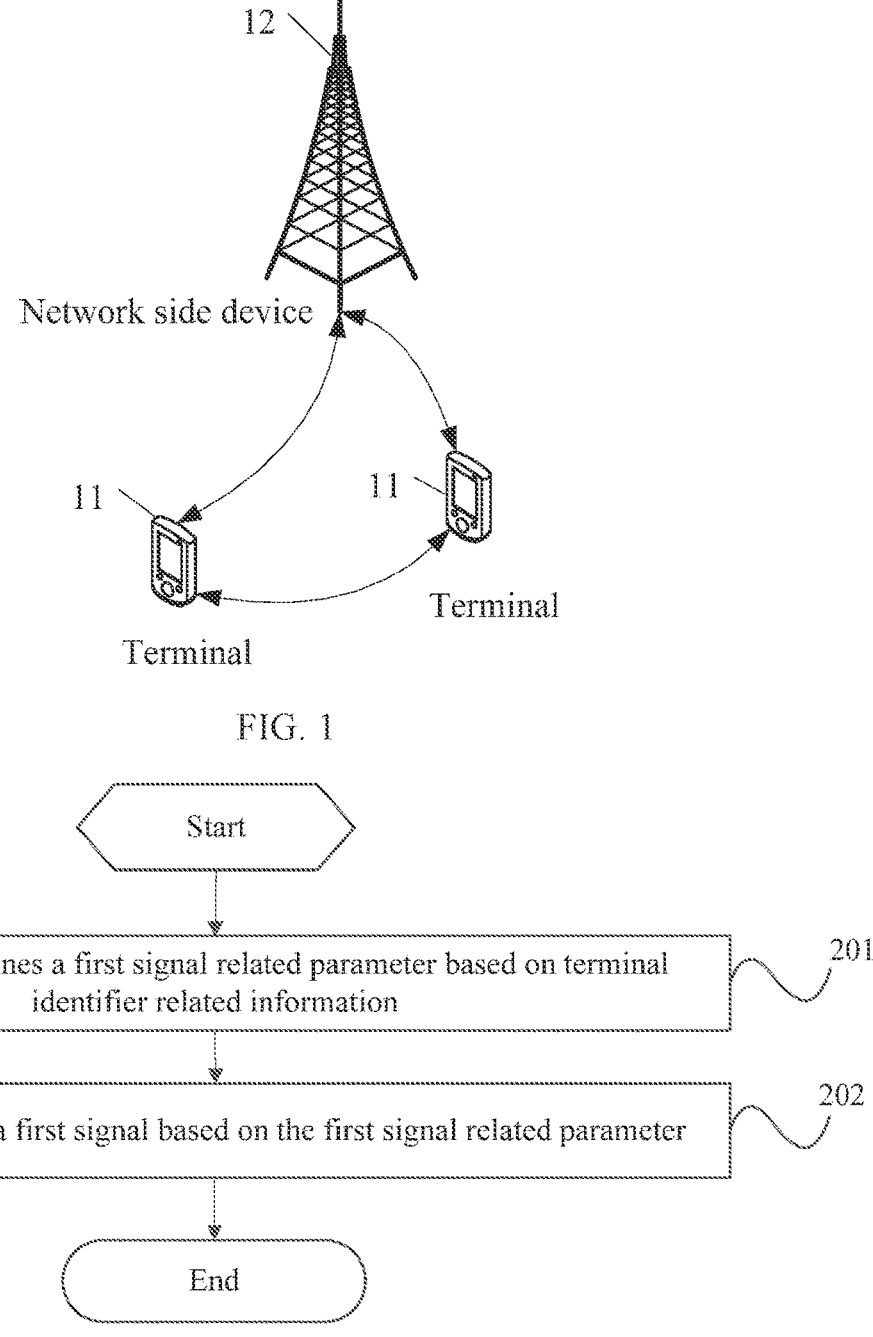
FIG. 1 is a structural diagram of a network system according to an embodiment of this application.
FIG. 2 is a first schematic flowchart of a random access method according to an embodiment of this application.

FIG. 1 is a block diagram of a wireless communications system to which an embodiment of this application can be applied. The wireless communications system includes a terminal 11 and a network side device 12. The terminal 11 may also be referred to as a terminal device or a UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a Wireless Local Area Network (WLAN) access point, a WiFi node, a Transmission and Reception Point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

With reference to the accompanying drawings, the random access method provided in the embodiments of this application is described in detail by using specific embodiments and application scenarios.

The random access method in this embodiment of this application can be applied to a cell free network system, the network system includes many APs, the UE communicates with one or more neighboring APs, and when the UE moves between APs, a serving AP of the UE changes.

As shown in FIG. 2, an embodiment of this application provides a random access method, including the following steps.

Step 201: A terminal determines a first signal related parameter based on terminal identifier related information.

In this embodiment of this application, the terminal identifier related information includes at least one of the terminal identifier and last X bit of the terminal identifier, where X is greater than or equal to 1. The terminal identifier includes at least one of the following:

an International Mobile Subscriber Identity (IMSI), an International Mobile Equipment Identity (IMEI), a Temporary Mobile Subscriber Identity (TMSI), a 5G S-Temporary Mobile Subscription Identifier (5G-S-TMSI), a Radio Network Temporary identifier (INTI), and a random number.

The terminal identifier can also be other types of terminal identifiers; or the terminal identifier can be a number generated according to a specific rule or formula, and the rule or formula is defined by the protocol or notified by the network side device to the terminal.

In some embodiments, the terminal identifier related information of the terminal in an inactive state is different from the terminal identifier related information of the terminal in an idle state. For example, when the terminal is in the inactive state, a Cell RNTI (C-RNTI) may be used as the terminal identifier related information; and when the UE is in the idle state, the IMSI or TMSI may be used as the terminal identifier related information.

In some embodiments, the terminal identifier related information of the terminal in the inactive state is the same as the terminal identifier related information of the terminal in the idle state, for example, the IMSI or TMSI.

For example; it is assumed that there are four UE groups: a group 1, a group 2, a group 3, and a group 4. A UE group ID (UE_GROUP_ID) of each UE is calculated according to the following formula, and the UE group ID is used to select the preamble.

$$UE\_GROUP\_ID=Floor[UE\_ID/S] \qquad 5$$

S represents a total number of UE groups, for example, S=4, a possible value of the UE group ID is 0, 1, 2 or 3, and S is defined by the protocol or indicated to UE by a base station through signaling. For example, S is indicated to UE through broadcast signaling. The UE_ID is UE identifier related information, for example, 5G-S-TMSI mod 1024.

Step 202: The terminal sends a first signal based on the first signal related parameter.

The first signal related parameter herein is determined based on the terminal identifier related information, which can be understood as that the first signal is associated with the terminal identifier related information. The first signal associated with the terminal identifier related information is sent to the network side device, so that the network side device may accurately, determine a terminal corresponding to the received first signal, and the network side device can determine location information of the terminal corresponding to the terminal identifier related information associated with the first signal, and then send a subsequent signal to the terminal based on the location information.

The first signal includes at least one of an SRS and a preamble of a first random access message; and the preamble of the first random access message may be a preamble of a message A of two-step random access or a message 1 of four-step random access.

The first signal related parameter includes at least one of the following:

sequence identification information of the first signal;

a time domain resource for the first signal; and a frequency domain resource for the first signal.

When the first signal is the preamble of the first random access message, the sequence identification information of the first signal is an identifier of the preamble, and if the preamble has different identifiers, at least one of the following included in the preamble sequence information is different: a scrambling sequence, an initialization sequence, a cyclic shift of sequence, and an orthogonal cover code.

The preamble in this embodiment of this application includes a Cyclic Prefix (CP) and a preamble sequence.

In the random access method of this embodiment of this application, the first signal sent by the terminal is associated with the terminal identification information; so that the network side device can determine the terminal corresponding to the received first signal, and then can accurately communicate with the corresponding terminal.

For example, the random access method in this embodiment of this application further includes:

receiving, by the terminal, a second signal, where the second signal is sent by a network side device through at least one node after determining location information of the terminal by receiving the first signal.

The second signal may be the message B of two-step random access; or the second signal is at least one of a message 2 of four-step random access and a message 4 of two-step random access.

In this embodiment of this application, the location information of the terminal has a correspondence with at least one of a beam, an AP, and a TRP.

In some embodiments, in a case that the first signal is the preamble of the first random access message:

the determining, by a terminal, a first signal related parameter based on terminal identifier related information includes:

determining a Random Access Channel Occasion (RACH Occasion) based on information about N1 detected third signals, where RACH is Random Access Channel, the RACH Occasion (RO) is associated with at least one of a time domain resource and a frequency domain resource for transmitting a preamble, the third signals include at least one of a downlink reference signal and a synchronization signal, N1 is an integer greater than or equal to 1, and the N1 third signals are sent through same or different nodes;

selecting, based on the terminal identifier related information; one preamble from at least one preamble corresponding to the RO; and determining a related parameter of the preamble of the first random access message based on the selected preamble.

In this embodiment of this application, the related parameter of the preamble of the first random access message is associated with at least one of N downlink reference signals and synchronization signals, and is associated with the terminal identifier related information.

As an implementation, the terminal determines an RO associated with N1 reference signals or synchronization signals based on a measurement result of the N1 reference signals or synchronization signals (for example, it can be determined based on the association relationship shown in Table 1), and then selects a preamble associated with the terminal identification information from all preambles corresponding to the RO; and as another implementation, the terminal determines an RO associated with N1 reference signals or synchronization signals based on a measurement result of the N1 reference signals or synchronization signals (for example, it can be determined based on the association relationship shown in Table 1) and a preamble candidate set, and then selects a preamble associated with the terminal identification information from the preamble candidate set, where the preamble candidate set is determined based on the preamble associated with the RO.

Further, a group identifier of the terminal is associated with a first preamble group identifier, and the group identifier of the terminal is obtained based on the terminal identifier related information, and the first preamble group identifier is an identifier of a preamble group in which the selected preamble is located.

Herein, in the foregoing two implementations, the preamble may be divided into M groups, and each preamble group is corresponding to a preamble group identifier. The group identifier of the preamble associated with the terminal identification information is the same as the group identifier of the terminal.

TABLE 1

| SSB information | RO |
|---|---|
| SSB 1, SSB 2 | {preamble identifier, preamble time domain resource, preamble frequency domain resource} combination 1 |
| SSB 2, SSB 3 | {preamble identifier, preamble time domain resource, preamble frequency domain resource} combination 2 |
| SSB 1, SSB 3 | {preamble identifier, preamble time domain resource, preamble frequency domain resource} combination 3 |

TABLE 1-continued

| SSB information | RO |
|---|---|
| SSB 2, SSB 3, SSB 1 | {preamble identifier, preamble time domain resource, preamble frequency domain resource} combination 4 |
| SSB 1 | {preamble identifier, preamble time domain resource, preamble frequency domain resource} combination 5 |
| SSB 2 | {preamble identifier, preamble time domain resource, preamble frequency domain resource} combination 6 |
| SSB 3 | {preamble identifier, preamble time domain resource, preamble frequency domain resource} combination 7 |

The preamble identifier or the preamble index is associated with the preamble sequence format (for example, at least one of sequence length, Subcarrier Spacing (SCS), and root sequence).

Each combination of {preamble identifier, preamble time domain resource, preamble frequency domain resource} may include a plurality of combinations of values of preamble identifier, preamble time domain resource, preamble frequency domain resource, and the terminal may select one combination of values of {preamble identifier, preamble time domain resource, preamble frequency domain resource}.

The third signal includes at least one of the following:

a Synchronization Signal and PBCH Block (SSB), a Channel State Information Reference Signal (CSI-RS), a Tracking Reference Signal (TRS), a Positioning Reference Signal (PRS), and another downlink reference signal.

In some embodiments, sync rasters of the N1 reference signals or synchronization signals (such as the SSB) are different.

In some embodiments, frequency domain resources (such as the carrier or Resource Block (RB)) or time domain resources of the N1 reference signals or synchronization signals are different.

In some embodiments, based on information about detected N1 reference signals or synchronization signals, the terminal determines related information of N1 messages 1 and sends a plurality of messages 1, or determines related information of N1 messages A and sends a plurality of messages A.

In some embodiments, sequence formats of the N1 reference signals or synchronization signals are different.

In some embodiments, the N1 reference signals or synchronization signals are sent through same or different APs/TRPs (for example, the AP/TRP(s) associated with N SSBs are different).

In some embodiments, the terminal determines, based on information about detected N1 reference signals or synchronization signals, beam information that is used to send the message 1 or the message A.

The information about N1 reference signals or synchronization signals is determined by using the following method:

information about N1 reference signals or synchronization signals obtained by UE through measurement, where the information obtained through measurement includes at least one of a Reference Signal Received Power (RSRP), a Signal to Interference plus Noise Ratio (SINR), and a Reference Signal Received Quality (RSRQ), where the RSRP, SINR and/or RSRQ obtained through measurement are all greater than or equal to a first threshold, and/or a difference between RSRP, SINR and RSRQ is less than or equal to a second threshold; and the first threshold and the second threshold are notified to the UE by the network side device through a system message.

For example, the random access method in this embodiment of this application further includes:

determining N2 path loss values based on an RSRP of detected N2 third signals, where the third signals include at least one of a downlink reference signal and a synchronization signal, and N2 is an integer greater than or equal to 1; and determining a sending power of the first signal based on the N2 path loss values For example, real values of the N2 path loss values are added to obtain a sum, and then a target path loss value is obtained by taking 10 as the base to log the sum. Then a sending power of the first signal is calculated based on the target path loss value.

Herein, considering the RSRP of a plurality of third signals associated with the first signal, for example, the plurality of SSBs are sent through a plurality of APs, for the sending power of the first signal, a path loss from the plurality of APs to the terminal needs to be considered. For example, a sending power of the message A of two-step random access or a sending power of the message 1 of four-step random access is determined based on the path loss from the plurality of APs to the terminal.

If the first signal is retransmitted (for example, the message A is retransmitted, or the message 1 is retransmitted), a sending power of retransmission is increased based on the number of retransmissions, and if an SSB index is changed when the message A is retransmitted, the power is not increased.

For example, the random access method in this embodiment of this application further includes:

determining a sending carrier of the first signal based on measurement information of detected N3 third signals, where N3 is an integer greater than or equal to 1, where the third signals include at least one of a downlink reference signal and a synchronization signal, and the measurement information includes at least one of the following:

an RSRP;

an SINR; and an RSRQ.

In this embodiment of this application, in a case that the LIE is configured by the base station with a plurality of uplink carriers (for example, a high-frequency carrier and a low-frequency carrier) to send the message 1 (or the message A), if the RSRP, SINR and/or RSRQ of N3 third signals are all less than a third threshold, the UE sends an MSG 1 through the target carrier (for example, a carrier with lower frequency); otherwise, the message 1 (or the message A) is sent through another carrier (for example, a carrier with higher frequency).

The method for determining a Random Access RNTI (RA-RNTI) is: an RA-RNTI calculation formula is related to which carrier for sending the message 1 (or the message A), for example, a carrier ID.

In addition, in this embodiment of this application, the method for determining the beam of the message A or the message 1 includes: if a frequency range is FR2, the message A or the message 1 needs to be sent to two TRPs or APs respectively through two beams of one panel or two beams of two panels.

In some embodiments, the sending a first signal includes:

sending a message A of two-step random access, where the message A includes a preamble and a Physical Uplink Shared Channel (PUSCH).

In some embodiments, the sending a first signal further includes:

sending an SRS before or after the PUSCH; or sending an SRS in the process of sending the PUSCH.

In this embodiment of this application, the terminal identifier related information is associated with the SRS, and the association rule is defined by the protocol. The time domain resource and the frequency domain resource of the SRS are the same as those of the PUSCH, or the time domain resource and the frequency domain resource of the SRS are notified to the terminal by the network side device.

In some embodiments, the second signal is the message B of two-step random access; and before the receiving a second signal, the method further includes:

receiving a fourth signal, where the fourth signal is Quasi Co-Location (QCL) with a Demodulation Reference Signal (DMRS) of the message B of two-step random access; and the fourth signal is an SSB or a TRS, or the fourth signal is the strongest SSB or a downlink reference signal detected by the terminal.

Herein, the network side device assists the terminal to receive the message B by sending the fourth signal.

In some embodiments, the sending a first signal includes:

sending a message 1 of four-step random access.

In some embodiments, the receiving a second signal includes:

receiving a message 2 of four-step random access, where the message 2 includes a related parameter of a preamble of the message 1.

A transmission parameter of the message 2 is determined by the network side device based on location information of the terminal corresponding to the first signal, and the transmission parameter includes at least one of a transmission node identifier and a beam.

In some embodiments, the message 2 indicates that the terminal receives at least one of a time domain location and a frequency domain location corresponding to the message 4.

In some embodiments, the message 2 indicates a time-frequency domain resource and a transmission format of the message 3.

In this embodiment of this application, if the terminal successfully receives a message 2 (using the RA-RNTI for decoding), and a preamble identifier in the message 2 is the same as that sent by the terminal, it is considered that the message 2 is successfully received. In this case, the terminal may stop monitoring the message 2.

If the terminal does not receive the message 2, or the message 2 is received, but the message 2 does not carry the preamble identifier, the terminal retransmits the message 1.

A transmission format of the message 1 herein is the same as that of the previously sent message 1; and a sending power of the retransmitted message 1 is higher than that of initial transmission.

For example, the random access method in this embodiment of this application further includes:

in a case that a preamble identifier in a related parameter of a preamble carried in the message 2 is the same as an identifier of a preamble sent by the terminal, sending a message 3 of four-step random access.

In some embodiments, the sending a first signal further includes:

sending an SRS before or after the message 3; or sending an SRS on at least one symbol of a slot in which the message 3 is located.

In this embodiment of this application, the terminal identifier related information is associated with the SRS, and the association rule is defined by the protocol. The time domain resource and the frequency domain resource of the SRS are the same as those of the PUSCH, or the time domain resource and the frequency domain resource of the SRS are notified to the terminal by the network side device through the message 2.

For example, the random access method in this embodiment of this application further includes:

receiving a fifth signal, where the fifth signal is quasi co-located with a DMRS of a message 4 of four-step random access, and the fifth signal is an SSB or a TRS, or the fifth signal is a DMRS of the message 2.

On this embodiment of this application, the network side device may determine the location information of the corresponding terminal based on the SRS, determine the transmission parameter of the message 4 based on the location information, and send the message 4 based on the determined transmission parameter. Before sending the message 4, the fifth signal is sent to the terminal to assist the terminal to receive the message 4.

In some embodiments, before Step 201, the method further includes:

receiving, by the terminal, at least one of the following items indicated by the network side device through signaling, such as a System Information Block (SIB):

a plurality of pieces of transmission node information (such as ID information), where the transmission node may be a cell, a TRP and/or an AP;

location information of the transmission node (which can be encrypted); and

SSB, CSI-RS or TRS information associated with each transmission node, such as signal sequence information, a signal time-frequency resource; and the like.

The foregoing SIB is an SIB sent by a cell, a TRP, or an AP, or is sent over a Single Frequency Network (SFN).

In some embodiments, before Step 201, the method further includes:

receiving, by the terminal, the RACH resource indicated by the network side device through signaling, such as the SIB. For example, in a cell free scenario, the SIB includes information about a shared RACH resource corresponding to a plurality of surrounding cells, TRPs or APs, where the SIB is an SIB sent by a cell, a TRP, or an AP, or is sent over an SFN.

In some embodiments, the network side device may broadcast a plurality of pieces of frequency point information of the RACH resource through the SIB, and the terminal may select one of a plurality of frequency points for RACH transmission, for example, selecting one frequency point based on a measured SSB RSRP size for RACH transmission.

In this embodiment of this application, the first signal sent by the terminal is associated with the terminal identification information, so that the network side device can determine the terminal corresponding to the received first signal, then determine the location information of the terminal corresponding to the first signal, and then adjust, based on the location information of the terminal, a transmission parameter, such as a transmission node or beam information, for sending a subsequent signal (the message 2, the message 4, or the message B), so as to reduce potential interference between APs or TRPs and improve the signal received quality of the subsequent signal.

Figures 3, 4, 5:
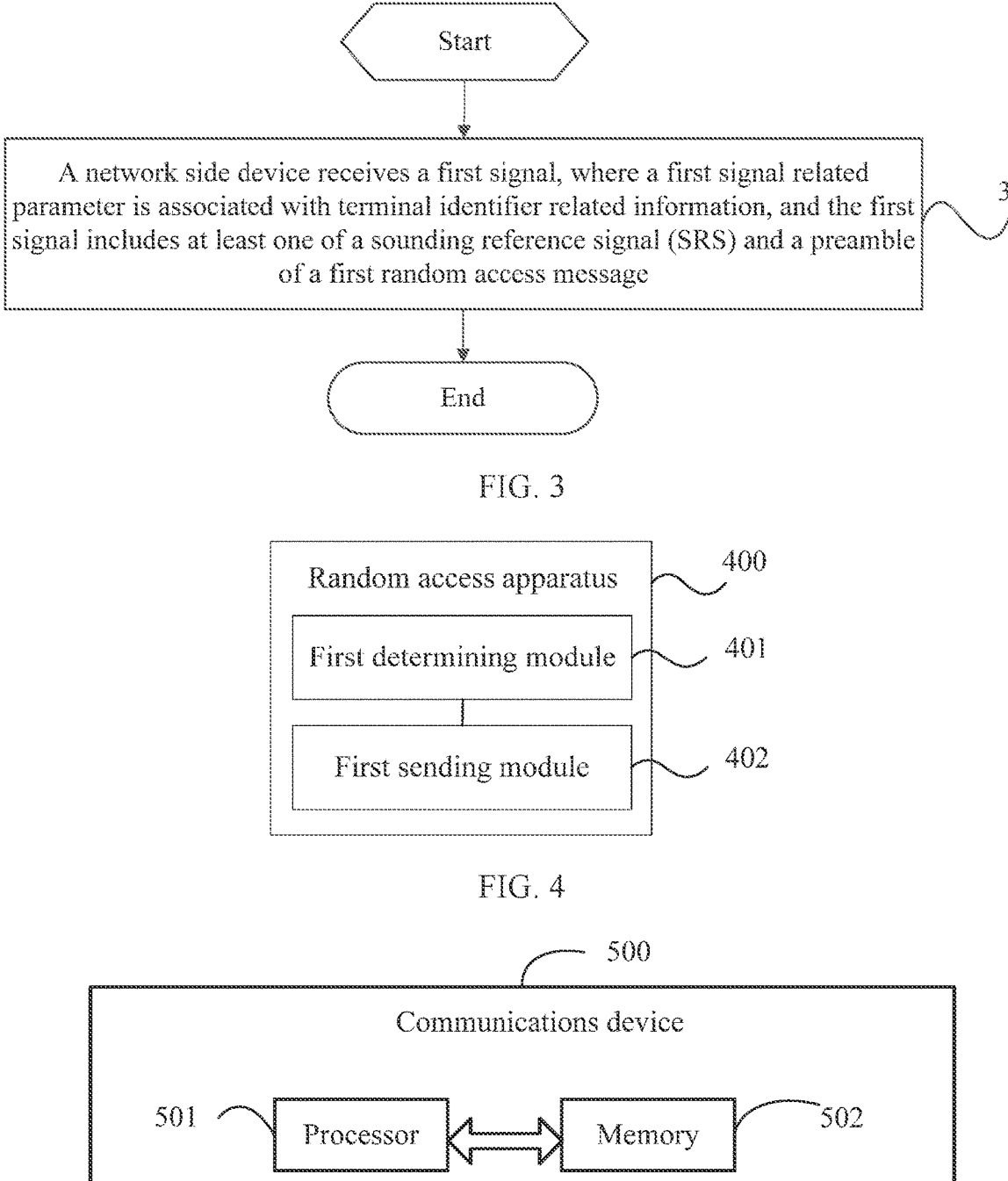
FIG. 3 is a second schematic flowchart of a random access method according to an embodiment of this application.
FIG. 4 is a first schematic diagram of a module of a random access apparatus according to an embodiment of this application.
FIG. 5 is a structural block diagram of a communications device according to an embodiment of this application.

As shown in FIG. 3, an embodiment of this application further provides a random access method, including the following steps.

Step 301: A network side device receives a first signal, where a first signal related parameter is associated with terminal identifier related information, and the first signal includes at least one of an SRS and a preamble of a first random access message.

Herein, the terminal identifier related information is described in detail in the random access method embodiment of the terminal side, and details are not described herein again.

The network side device in this step may be the AP or TRP.

According to the random access method in this embodiment of this application, the first signal is associated with the terminal identification information, so that the network side device can determine the terminal corresponding to the received first signal, then determine the location information of the terminal corresponding to the first signal, and then adjust, based on the location information of the terminal, a transmission parameter, such as a transmission node or beam information, for sending a subsequent signal (for example, the message 2, the message 4, or the message B), so as to reduce potential interference between APs or TRPs and improve the signal received quality of the subsequent signal.

For example, the random access method in this embodiment of this application further includes:

determining, by the network side device, location information of a terminal corresponding to the first signal.

The network side device in this step may refer to a central processing unit connected to a plurality of APs or TRPs, and the central processing unit determines the location information of the corresponding terminal based on first signals received by the plurality of APs or TRPs.

The network side device determines a transmission parameter of a second signal based on the location information of the terminal, where the transmission parameter of the second signal includes at least one of the following: identification information of at least one node for sending the second signal and beam information for sending the second signal, where the first signal related parameter includes at least one of the following:

sequence identification information of the first signal;

a time domain resource for the first signal; and a frequency domain resource for the first signal.

For example, the random access method in this embodiment of this application further includes:

sending, by the network side device, the second signal to the terminal through at least one node based on the transmission parameter of the second signal.

The second signal may be the message B of two-step random access; or the second signal is at least one of a message 2 of four-step random access and a message 4 of two-step random access.

In some embodiments, the determining a transmission parameter of a second signal based on the location information of the terminal includes:

determining, based on a correspondence between the location information of the terminal and the transmission parameter, a first transmission parameter corresponding to the location information of the terminal; and determining the first transmission parameter as the transmission parameter of the second signal.

In this embodiment of this application, the correspondence between the location information of the terminal and the transmission parameter can be determined through Table 2, Table 3 and/or Table 4,

TABLE 2

| Location information of UE | Beam information |
| --- | --- |
| Location 1 | Beam 1 of cell 1 (for example, QCL with SSB 1) |
| Location 2 | Beam 2 of cell 1 (QCL with SSB 2) |
| Location 3 | Beam 3 of cell 1 (QCL with SSB 3) |
| Location 4 | Beam 4 of cell 1 (QCL with SSB 4) |

TABLE 3

| Location information of UE | AP/TRP information |
| --- | --- |
| Location 1 | AP/TRP 1 |
| Location 2 | AP/TRP 1, AP/TRP 2 |
| Location 3 | AP/TRP 2 |
| Location 4 | AP/TRP 3 |

TABLE 4

| Location information of UE | AP/beam information |
| --- | --- |
| Location 1 | Beam A of AP1 |
| Location 2 | Beam B of AP1 and AP2 (beam B is sent through both AP1 and AP2) |
| Location 3 | Beam C of AP2 |
| Location 4 | Beam D of AP3 and beam E of AP4 (beam D and beam E are sent respectively through AP3 and AP4) |

As an implementation, the receiving a first signal includes:

receiving a message A of two-step random access, where the message A includes a preamble and a PUSCH.

Herein, after successfully receiving the message A, the network side device can determine the location information of the corresponding terminal, and determine at least one of the transmission node and the beam associated with the location information, and send the message B based on at least one of the transmission node and the beam.

In some embodiments, the receiving a first signal further includes:

receiving an SRS before or after the PUSCH; or receiving an SRS on at least one symbol of a slot in which the PUSCH is located.

Herein, in addition to the message A, if further receiving the SRS, the terminal can determine the location information of the corresponding terminal based on the SRS or the message A, determine at least one of the transmission node and the beam associated with the location information, and send the message B based on at least one of the transmission node and the beam.

In some embodiments, the second signal is the message B of two-step random access; and before the sending the second signal, the method further includes:

sending a fourth signal through a node, where the fourth signal is QCL with a DMRS of the message B of two-step random access; and the fourth signal is an SSB or a TRS.

In this embodiment of this application, before the terminal receives the message B, the network side device can further send the fourth signal to the terminal through the corresponding node based on the determined transmission parameter of the message B, so as to assist the terminal to receive the message B.

As another implementation, the receiving a first signal includes:

receiving a message 1 of four-step random access.

In some embodiments, the sending the second signal includes:

sending a message 2 of four-step random access, where the message 2 includes a related parameter of a preamble of the message 1.

In this embodiment of this application, after the network side device successfully, receives the message 1, the location information of the corresponding terminal is determined based on the message 1, the transmission parameter of the message 2 is determined based on the determined location information, and the message 2 is sent to the corresponding terminal based on the transmission parameter.

In some embodiments, the message 2 indicates that the terminal receives at least one of a time domain location and a frequency domain location corresponding to the message 4, to reduce interference.

In some embodiments, the message 2 indicates a time-frequency domain resource and a transmission format of the message 3.

For example, the random access method in this embodiment of this application further includes:

receiving a message 3 of four-step random access, where the message 3 is sent by the terminal in a case that a preamble identifier in a related parameter of a preamble carried in the message 2 is the same as an identifier of a preamble sent by the terminal.

In some embodiments, the obtaining a first signal further includes:

receiving an SRS before or after the message 3; or receiving an SRS on at least one symbol of a slot in which the message 3 is located.

For example, the random access method in this embodiment of this application further includes:

sending a message 4 of four-step random access.

In this embodiment of this application, in addition to the message 1, if further receiving the SRS, the terminal can determine the location information of the corresponding terminal based on the SRS or the message 1, determine at least one of the transmission node and the beam associated with the location information, and send the message 4 based on at least one of the transmission node and the beam.

In some embodiments, before sending a message 4 of four-step random access, the method further includes:

sending a fifth signal through a node, where the fifth signal is quasi co-located with a DMRS of the message 4, and the fifth signal is a DMRS of the message 2 of four-step random access, or the fifth signal is an SSB or a TRS.

In this embodiment of this application, before the terminal receives the message 4, the network side device can further send the fifth signal to the terminal through the corresponding node based on the determined transmission parameter of the message 4, so as to assist the terminal to receive the message 4.

According to the random access method in this embodiment of this application, the first signal is associated with the terminal identification information, so that the network side device can determine the terminal corresponding to the received first signal, then determine the location information of the terminal corresponding to the first signal, and then adjust, based on the location information of the terminal, a transmission parameter, such as a transmission node or beam information, for sending a subsequent signal (for example, the message 2, the message 4, or the message B), so as to reduce potential interference between APs or TRPs and improve the signal received quality of the subsequent signal.

It should be noted that an execution subject of the random access method provided in this embodiment of this application may be a random access apparatus, or a control module configured to execute the random access method in the random access apparatus. In this embodiment of this application, the random access apparatus provided in this embodiment of this application is described by using an example in which the random access method is implemented by the random access apparatus.

As shown in FIG. 4, an embodiment of this application further provides a random access apparatus 400, including:

a first determining module 401, configured to determine a first signal related parameter based on terminal identifier related information; and a first sending module 402, configured to send a first signal based on the first signal related parameter, where the first signal includes at least one of an SRS and a preamble of a first random access message; and the first signal related parameter includes at least one of the following:

sequence identification information of the first signal;

a time domain resource for the first signal; and a frequency domain resource for the first signal.

The random access apparatus in this embodiment of this application further includes:

a first receiving module, configured to receive a second signal, where the second signal is sent by a network side device through at least one node after determining location information of the terminal by receiving the first signal.

According to the random access apparatus in this embodiment of this application, in a case that the first signal is the preamble of the first random access message:

the first determining module includes:

a first determining submodule, configured to determine an RO based on information about N1 detected third signals, where the RO is associated with at least one of a time domain resource and a frequency domain resource for transmitting a preamble, the third signals include at least one of a downlink reference signal and a synchronization signal, N1 is an integer greater than or equal to 1, and the N1 third signals are sent through same or different nodes;

a selecting submodule, configured to select, based on the terminal identifier related information, one preamble from at least one preamble corresponding to the RO; and a second determining submodule, configured to determine a related parameter of the preamble of the first random access message based on the selected preamble.

According to the random access apparatus in this embodiment of this application, a group identifier of the terminal is associated with a first preamble group identifier, and the group identifier of the terminal is obtained based on the terminal identifier related information, and the first preamble group identifier is an identifier of a preamble group in which the selected preamble is located.

The random access apparatus in this embodiment of this application further includes:

a fourth determining module, configured to determine N2 path loss values based on an RSRP of detected N2 third signals, where the third signals include at least one of a downlink reference signal and a synchronization signal, and N2 is an integer greater than or equal to 1; and a fifth determining module, configured to determine a sending power of the first signal based on the N2 path loss values.

The random access apparatus in this embodiment of this application further includes:

a sixth determining module, configured to determine a sending carrier of the first signal based on measurement information of detected N3 third signals, where N3 is an integer greater than or equal to 1, where the third signals include at least one of a downlink reference signal and a synchronization signal, and the measurement information includes at least one of the following:

an RSRP;

an SINR; and an RSRQ.

According to the random access apparatus in this embodiment of this application, the first sending module is configured to send a message A of two-step random access, where the message A includes a preamble and a PUSCH.

According to the random access apparatus in this embodiment of this application, the first sending module is further configured to: send an SRS before or after the PUSCH; or send an SRS on at least one symbol of a slot in which the PUSCH is located.

According to the random access apparatus in this embodiment of this application, the second signal is the message B of two-step random access, and the apparatus further includes:

a third receiving module, configured to receive a fourth signal before the first receiving module receives the second signal, where the fourth signal is QCL with a DMRS of the message B of two-step random access; and the fourth signal is an SSB or a IRS.

According to the random access apparatus in this embodiment of this application, the first sending module is configured to send a message 1 of four-step random access.

According to the random access apparatus in this embodiment of this application, the first receiving module is configured to receive a message 2 of four-step random access, where the message 2 includes a related parameter of a preamble of the message 1.

The random access apparatus in this embodiment of this application further includes:

a third sending module, configured to: in a case that a preamble identifier in a related parameter of a preamble carried in the message 2 is the same as an identifier of a preamble sent by the terminal, send a message 3 of four-step random access.

According to the random access apparatus in this embodiment of this application, the first sending module is further configured to: send an SRS before or after the message 3; or send an SRS on at least one symbol of a slot in which the message 3 is located.

The random access apparatus in this embodiment of this application further includes:

a fourth receiving module, configured to receive a fifth signal, where the fifth signal is quasi co-located with a DMRS of a message 4 of four-step random access, and the fifth signal is an SSB or a IRS, or the fifth signal is a DMRS of the message 2.

According to the random access method and the random access apparatus of this embodiment of this application, the first signal sent by the terminal is associated with the terminal identification information, so that the network side device can determine the terminal corresponding to the received first signal, and then can accurately communicate with the corresponding terminal.

The random access apparatus in this embodiment of this application may be an apparatus, or may be a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a Personal Computer (PC), a Television (TV), a teller machine, or a self-service machine. This is not specifically limited in this embodiment of this application.

The random access apparatus in this embodiment of this application may be an apparatus with an operating system. The operating system may be an Android operating system, may be an iOS operating system, or may be another possible operating system. This is not specifically limited in this embodiment of this application.

The random access apparatus provided in this embodiment of this application can implement the processes implemented in the method embodiment of FIG. 2, and a same technical effect can be achieved, To avoid repetition, details are not described herein again.

For example, as shown in FIG. 5, an embodiment of this application further provides a communications device 500, including a processor 501, a memory 502, a program or an instruction stored in the memory 502 and executable on the processor 501. For example, when the communications device 500 is a terminal, the program or the instruction is executed by the processor 501 to implement processes of the embodiment of the foregoing random access method applied to the terminal, and a same technical effect can be achieved. When the communications device 500 is a network side device, the program or the instruction is executed by the processor 501 to implement processes of the embodiment of the foregoing random access method applied to the network side device, and a same technical effect can be achieved. To avoid repetition, details are not described herein again.

Figure 6:
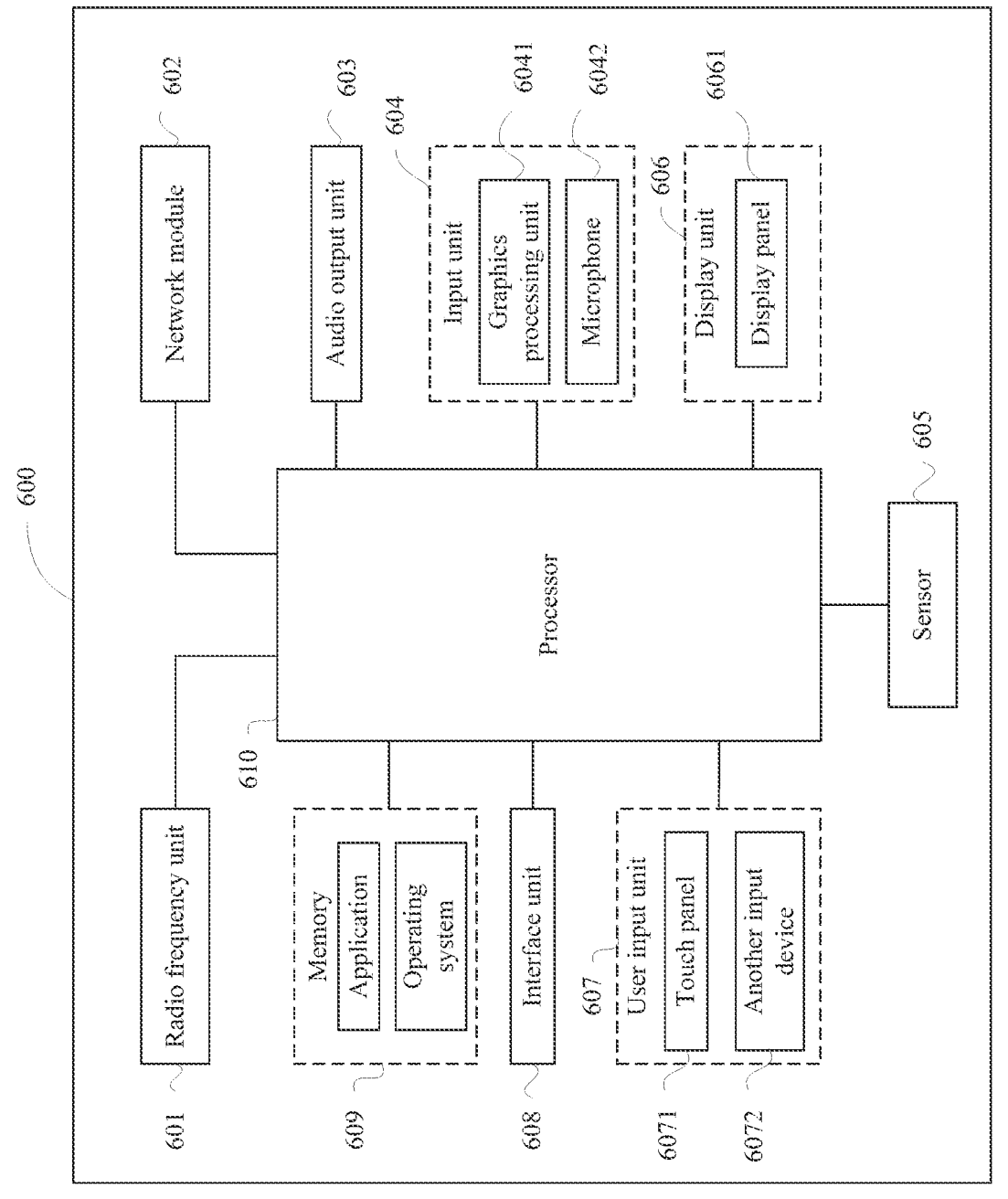
FIG. 6 is a structural block diagram of a terminal according to an embodiment of this application.

FIG. 6 is a schematic diagram of a hardware structure of a terminal according to an embodiment of this application. A terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in this embodiment of this application, the input unit 604 may include a Graphics Processing Unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061, and the display panel 6061 may be configured in a form of a liquid crystal display, an organic light emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area. The program or instruction storage area may store an operating system, and an application or an instruction required by at least one function (for example, a sound playing function or an image playing function). In addition, the memory 609 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 610 may include one or more processing units. In some embodiments, an application processor and a modem processor may be integrated into the processor 610. The application processor mainly processes an operating system, a user interface, an application, an instruction, or the like. The modem processor mainly processes wireless communications; for example, a baseband processor. It can be understood that, in some alternative embodiments, the modem processor may not be integrated into the processor 610.

The processor 610 is configured to: determine a first signal related parameter based on terminal identifier related information; and control the radio frequency unit 601 to send a first signal based on the first signal related parameter, where the first signal includes at least one of an SRS and a preamble of a first random access message; and the first signal related parameter includes at least one of the following: sequence identification information of the first signal;

a time domain resource for the first signal; and a frequency domain resource for the first signal.

In some embodiments, the radio frequency unit 601 is further configured to:

receive a second signal, where the second signal is sent by a network side device through at least one node after determining location information of the terminal by receiving the first signal.

In some embodiments, in a case that the first signal is the preamble of the first random access message:

the processor 610 is configured to: determine an RO based on information about N1 detected third signals, where the RO is associated with at least one of a time domain resource and a frequency domain resource for transmitting a preamble, the third signals include at least one of a downlink reference signal and a synchronization signal, N1 is an integer greater than or equal to 1, and the N1 third signals are sent through same or different nodes;

select; based on the terminal identifier related information, one preamble from at least one preamble corresponding to the RO; and determine a related parameter of the preamble of the first random access message based on the selected preamble.

In some embodiments, a group identifier of the terminal is associated with a first preamble group identifier, and the group identifier of the terminal is obtained based on the terminal identifier related information, and the first preamble group identifier is an identifier of a preamble group in which the selected preamble is located.

In some embodiments, the processor 610 is further configured to:

determine N2 path loss values based on an RSRP of detected N2 third signals, where the third signals include at least one of a downlink reference signal and a synchronization signal, and N2 is an integer greater than or equal to 1; and determine a sending power of the first signal based on the N2 path loss values.

In some embodiments, the processor 610 is further configured to:

determine a sending carrier of the first signal based on measurement information of detected N3 third signals, where N3 is an integer greater than or equal to 1, where the third signals include at least one of a downlink reference signal and a synchronization signal, and the measurement information includes at least one of the following:

an RSRP;

an SINR; and an RSRQ.

In some embodiments, the radio frequency unit 601 is further configured to:

send a message A of two-step random access, where the message A includes a preamble and a PUSCH.

In some embodiments, the radio frequency unit 601 is further configured to:

send an SRS before or after the PUSCH; or send an SRS on at least one symbol of a slot in which the PUSCH is located.

In some embodiments, the second signal is the message B of two-step random access; and the radio frequency unit 601 is further configured to:

receive a fourth signal before receiving the second signal, where the fourth signal is with a DMRS of the message B of two-step random access; and the fourth signal is an SSB or a TRS.

In some embodiments, the radio frequency unit 601 is configured to send a message 1 of four-step random access.

In some embodiments, the radio frequency unit 601 is configured to receive a message 2 of four-step random access, where the message 2 includes a related parameter of a preamble of the message 1.

In some embodiments, the radio frequency unit 601 is further configured to: in a case that a preamble identifier in a related parameter of a preamble carried in the message 2 is the same as an identifier of a preamble sent by the terminal, send a message 3 of four-step random access.

In some embodiments, the radio frequency unit 601 is further configured to: send an SRS before or after the message 3; or send an SRS on at least one symbol of a slot in which the message 3 is located.

In some embodiments, the radio frequency unit 601 is further configured to receive a fifth signal, where the fifth signal is quasi co-located with a DMRS of a message 4 of four-step random access, and the fifth signal is an SSB or a IRS, or the fifth signal is a DMRS of the message 2.

According to the terminal and the random access method of this embodiment of this application, the first signal sent by the terminal is associated with the terminal identification information, so that the network side device can determine the terminal corresponding to the received first signal, and then can accurately communicate with the corresponding terminal.

Figure 7:
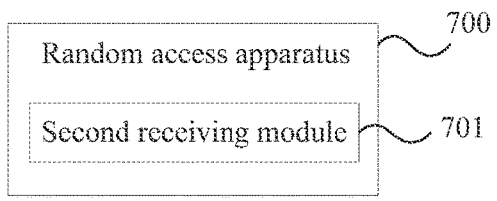
FIG. 7 is a second schematic diagram of a module of a random access apparatus according to an embodiment of this application.

As shown in FIG. 7, an embodiment of this application further provides a random access apparatus 700, including:

a second receiving module 701, configured to receive a first signal, where a first signal related parameter is associated with terminal identifier related information, and the first signal includes at least one of an SRS and a preamble of a first random access message, where the first signal related parameter includes at least one of the following:

sequence identification information of the first signal;

a time domain resource for the first signal; and a frequency domain resource for the first signal.

The random access apparatus in this embodiment of this application further includes:

a second determining module, configured to determine location information of a terminal corresponding to the first signal;

a third determining module, configured to determine a transmission parameter of a second signal based on the location information of the terminal, where the transmission parameter of the second signal includes at least one of the following: identification information of at least one node for sending the second signal and beam information for sending the second signal; and a second sending module, configured to send the second signal to the terminal through at least one node based on the transmission parameter of the second signal.

According to the random access apparatus in this embodiment of this application, the third determining module includes:

a third determining submodule, configured to determine, based on a correspondence between the location information of the terminal and the transmission parameter, a first transmission parameter corresponding to the location information of the terminal; and a fourth determining submodule, configured to determine the first transmission parameter as the transmission parameter of the second signal.

According to the random access apparatus in this embodiment of this application, the second receiving module is configured to receive a message A of two-step random access, where the message A includes a preamble and a PUSCH.

According to the random access apparatus in this embodiment of this application, the second receiving module is further configured to: receive an SRS before or after the PUSCH; or receive an SRS on at least one symbol of a slot in which the PUSCH is located.

According to the random access apparatus in this embodiment of this application, the second signal is the message B of two-step random access, and the apparatus further includes:

a fourth sending module, configured to send a fourth signal through a node before the second sending module sends the second signal, where the fourth signal is QCL with a demodulation reference signal (DMRS) of the message B of two-step random access; and the fourth signal is an SSB or a TRS.

According to the random access apparatus in this embodiment of this application, the second receiving module is configured to receive a message 1 of four-step random access.

According to the random access apparatus in this embodiment of this application, the second sending module is configured to send a message 2 of four-step random access, where the message 2 includes a related parameter of a preamble of the message 1.

The random access apparatus in this embodiment of this application further includes:

a fifth receiving module, configured to receive a message 3 of four-step random access, where the message 3 is sent by the terminal in a case that a preamble identifier in a related parameter of a preamble carried in the message 2 is the same as an identifier of a preamble sent by the terminal.

According to the random access apparatus in this embodiment of this application, the second receiving module is further configured to: receive an SRS before or after the message 3; or receive an SRS on at least one symbol of a slot in which the message 3 is located.

The random access apparatus in this embodiment of this application further includes:

a fifth sending module, configured to send a message 4 of four-step random access.

The random access apparatus in this embodiment of this application further includes:

a sixth sending module, configured to send a fifth signal through a node before the fifth sending module sends the message 4 of four-step random access, where the fifth signal is quasi co-located with a DMRS of the message 4, and the fifth signal is a DMRS of the message 2 of four-step random access, or the fifth signal is an SSB or a IRS.

According to the random access apparatus in this embodiment of this application, the first signal is associated with the terminal identification information, so that the network side device can determine the terminal corresponding to the received first signal, then determine the location information of the terminal corresponding to the first signal, and then adjust, based on the location information of the terminal, a transmission parameter, such as a transmission node or beam information, for sending a subsequent signal (for example, the message 2, the message 4, or the message B), so as to reduce potential interference between APs or TRPs and improve the signal received quality of the subsequent signal.

Figure 8:
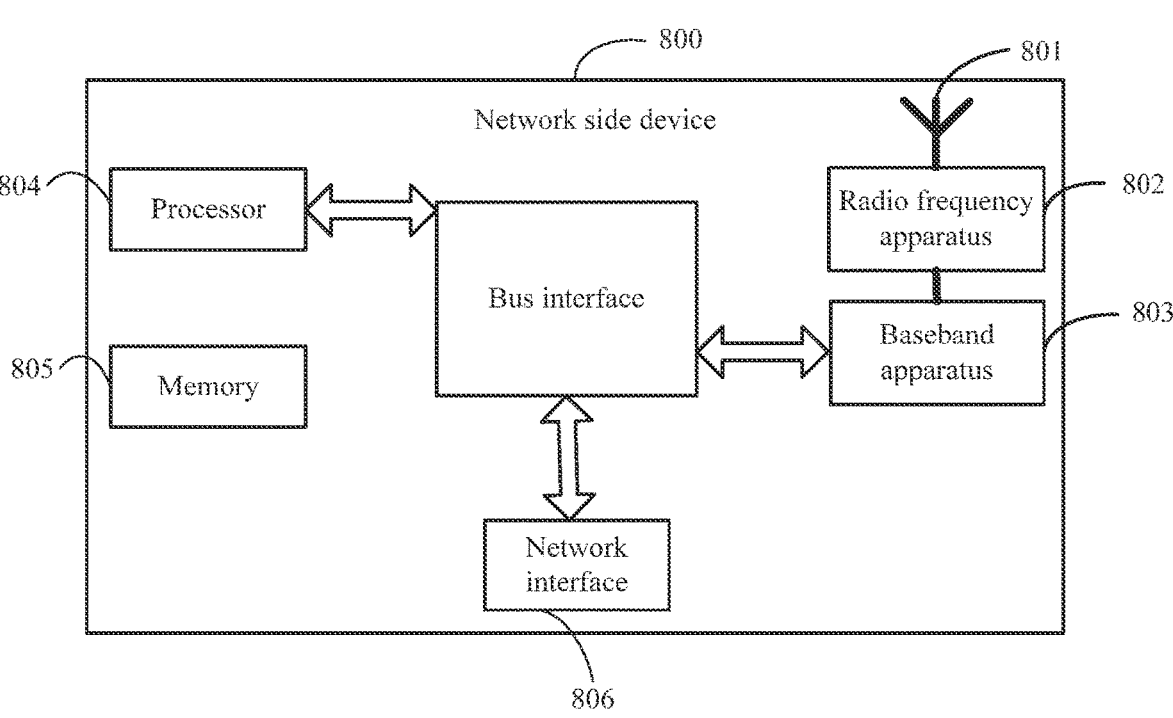
FIG. 8 is a structural block diagram of a network side device according to an embodiment of this application.

For example, an embodiment of this application further provides a network side device. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information to be sent and sends the information to the radio frequency apparatus 802, and the radio frequency apparatus 802 processes the received information and sends the information through the antenna 801.

The foregoing band processing apparatus may be located in the baseband apparatus 803, and the method performed by the network side device in the foregoing embodiment may be implemented in the baseband apparatus 803. The baseband apparatus 803 includes a processor 804 and a memory 805.

The baseband apparatus 803 may include, for example, at least one baseband board. A plurality of chips are disposed on the baseband board. As shown in FIG. 8, one chip is, for example, the processor 804, connected to the memory 805, to invoke a program in the memory 805, thereby performing operations of the network device shown in the foregoing method embodiment.

The baseband apparatus 803 may further include a network interface 806, configured to exchange information with the radio frequency apparatus 802, where the interface is, for example, a Common Public Radio Interface (CPRI).

For example, the network side device in this embodiment of the present application further includes an instruction or a program stored in the memory 805 and executable on the processor 804. The processor 804 invokes the instruction or the program in the memory 805 to perform the method performed by the modules shown in FIG. 7, with the same technical effect achieved. To avoid repetition, details are not provided herein again.

An embodiment of this application further provides a readable storage medium, where the readable storage medium stores a program or an instruction, and when the program or the instruction is executed by a processor, the processes of the foregoing random access method embodiment are implemented, and a same technical effect can be achieved. To avoid repetition, details are not described herein again.

The processor is a processor in the terminal in the foregoing embodiment. The readable storage medium includes a computer-readable storage medium, such as a computer ROM, a Random Access Memory (RAM), a magnetic disk, or an optical disc.

An embodiment of this application further provides a chip, where the chip includes a processor and a communications interface, the communications interface is coupled to the processor, and the processor is configured to run a program or an instruction to implement the processes of the foregoing random access method embodiment, and a same technical effect can be achieved. To avoid repetition, details are not described herein again.

An embodiment of this application provides a computer program product, the program product is stored in a non-volatile storage medium, the program product is executed by at least one processor to implement the processes of the foregoing random access method embodiment, and a same technical effect can be achieved. To avoid repetition, details are not described herein again.

An embodiment of this application provides a communications device, configured to perform the processes of the foregoing random access method embodiments, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the foregoing descriptions of the implementations, a person skilled in the art may clearly understand that the method in the foregoing embodiments may be implemented by using software in addition to a necessary universal hardware platform. In some alternative embodiments, the method in the foregoing embodiments may be implemented by hardware. In some embodiments, the technical solutions of this application may be implemented in a form of a software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementations. The foregoing specific implementations are merely illustrative instead of restrictive. Under the enlightenment of this application, a person of ordinary skill in the art may make many forms without departing from the essence of this application and the protection scope of claims, all of which fall within the protection of this application.

The invention claimed is:

1. A random access method, comprising:
   determining, by a terminal, a first signal related parameter based on terminal identifier related information; and
   sending, by the terminal, a first signal based on the first signal related parameter,
   wherein:
      the first signal comprises at least one of a Sounding Reference Signal (SRS) or a preamble of a first random access message, and the first signal related parameter comprises at least one
of the following:
    sequence identification information of the first sig-
        nal;
    a time domain resource for the first signal; or
    a frequency domain resource for the first signal,
    wherein when the first signal is the preamble of the
        first random access message, determining the first
        signal related parameter based on the terminal
        identifier related information comprises:
    selecting one preamble from at least one preamble
        corresponding to a Random access channel Occa-
        sion (RO) based on the terminal identifier related
        information,
    wherein a group identifier of the terminal is associ-
        ated with a first preamble group identifier, wherein
        the group identifier of the terminal is obtained
        based on the terminal identifier related informa-
        tion, and the first preamble group identifier is an
        identifier of a preamble group in which the
        selected preamble is located.

2. The random access method according to claim 1,
further comprising:
    receiving, by the terminal, a second signal, wherein the
        second signal is sent by a network side device through
        at least one node after determining location information
        of the terminal by receiving the first signal.

3. The random access method according to claim 1,
wherein, when the first signal is the preamble of the first
random access message,
    determining, by the terminal, the first signal related
        parameter based on terminal identifier related informa-
        tion further comprises:
    determining the RO based on information about N1
        detected third signals, wherein the RO is associated
        with at least one of a time domain resource and a
        frequency domain resource for transmitting a preamble,
        and the third signals comprise at least one of a down-
        link reference signal or a synchronization signal,
        wherein N1 is an integer greater than or equal to 1, and
        the N1 third signals are sent through same or different
        nodes;
    and
    determining a related parameter of the preamble of the
        first random access message as the first signal related
        parameter based on the selected preamble.

4. The random access method according to claim 1,
further comprising:
    determining N2 path loss values based on a Reference
        Signal Received Power (RSRP) of detected N2 third
        signals, wherein the third signals comprise at least one
        of a downlink reference signal or a synchronization
        signal, and N2 is an integer greater than or equal to 1,
        and
    determining a sending power of the first signal based on
        the N2 path loss values;
    or the method further comprising:
    determining a sending carrier of the first signal based on
        measurement information of detected N3 third signals,
        wherein N3 is an integer greater than or equal to 1,
        wherein
    the third signals comprise at least one of a downlink
        reference signal and a synchronization signal, and the
        measurement information comprises at least one of the
        following:

an RSRP;
a Signal to Interference plus Noise Ratio (SINR); or
a Reference Signal Received Quality (RSRQ).

5. The random access method according to claim 2,
wherein the sending a first signal comprises:
    sending a message A of two-step random access, wherein
        the message A comprises a preamble and a Physical
        Uplink Shared Channel (PUSCH).

6. The random access method according to claim 5,
wherein the sending a first signal further comprises:
    sending an SRS before or after the PUSCH; or
    sending an SRS on at least one symbol of a slot in which
        the PUSCH is located.

7. The random access method according to claim 5,
wherein the second signal is a message B of two-step
random access; and
    before the receiving a second signal, the method further
        comprises:
    receiving a fourth signal,
    wherein:
        the fourth signal is Quasi Co-Located (QCL) with a
            Demodulation Reference Signal (DMRS) of the
            message B of two-step random access, and
        the fourth signal is a Synchronization Signal Block
            (SSB) or a Tracking Reference Signal (TRS).

8. The random access method according to claim 2,
wherein the sending a first signal comprises:
    sending a message 1 of four-step random access.

9. The random access method according to claim 8,
wherein the receiving a second signal comprises:
    receiving a message 2 of four-step random access,
        wherein the message 2 comprises a related parameter of
        a preamble of the message 1.

10. The random access method according to claim 9,
further comprising:
    when a preamble identifier in a related parameter of a
        preamble carried in the message 2 is the same as an
        identifier of a preamble sent by the terminal, sending a
        message 3 of four-step random access.

11. The random access method according to claim 10,
wherein the sending a first signal further comprises:
    sending an SRS before or after the message 3; or
    sending an SRS on at least one symbol of a slot in which
        the message 3 is located.

12. The random access method according to claim 11,
further comprising:
    receiving a fifth signal, wherein
    the fifth signal is Quasi Co-Located (QCL) with a
        Demodulation Reference Signal (DMRS) of a message
        4 of four-step random access, and the fifth signal is a
        Synchronization Signal Block (SSB) or a Tracking
        Reference Signal (TRS), or the fifth signal is a DMRS
        of the message 2.

13. A random access method, comprising:
    receiving, by a network side device, a first signal, wherein
        a first signal related parameter is associated with ter-
        minal identifier related information, and the first signal
        comprises at least one of a Sounding Reference Signal
        (SRS) or a preamble of a first random access message,
        wherein
    the first signal related parameter comprises at least one of
        the following:
    sequence identification information of the first signal;
    a time domain resource for the first signal; or
    a frequency domain resource for the first signal,
    wherein when the first signal is the preamble of the first
        random access message, a preamble from at least one preamble corresponding to a Random access channel Occasion (RO) is selected based on the terminal identifier related information, wherein a group identifier of the terminal is associated with a first preamble group identifier, wherein the group identifier of the terminal is obtained based on the terminal identifier related information, and the first preamble group identifier is an identifier of a preamble group in which the selected preamble is located.

14. The random access method according to claim 13, further comprising:

determining, by the network side device, location information of a terminal corresponding to the first signal;

determining, by the network side device, a transmission parameter of a second signal based on the location information of the terminal, wherein the transmission parameter of the second signal comprises at least one of the following: identification information of at least one node for sending the second signal or beam information for sending the second signal; and sending, by the network side device, the second signal to the terminal through at least one node based on the transmission parameter of the second signal.

15. The random access method according to claim 14, wherein the determining a transmission parameter of a second signal based on the location information of the terminal comprises:

determining, based on a correspondence between the location information of the terminal and the transmission parameter, a first transmission parameter corresponding to the location information of the terminal; and determining the first transmission parameter as the transmission parameter of the second signal.

16. The random access method according to claim 14, wherein the receiving a first signal comprises:

receiving a message A of two-step random access, wherein the message A comprises a preamble and a Physical Uplink Shared Channel (PUSCH).

17. The random access method according to claim 16, wherein the receiving a first signal further comprises:

receiving an SRS before or after the PUSCH; or receiving an SRS on at least one symbol of a slot in which the PUSCH is located.

18. The random access method according to claim 16, wherein the second signal is a message B of two-step random access; and before the sending the second signal, the method further comprises:

sending a fourth signal through a node, wherein the fourth signal is Quasi Co-Located (QCL) with a Demodulation Reference Signal (DMRS) of the message B of two-step random access; and the fourth signal is a Synchronization Signal Block (SSB) or a Tracking Reference Signal (TRS).

19. A terminal, comprising a processor; a memory having a computer program or an instruction stored thereon, wherein the computer program or the instruction, when executed by the processor, causes the processor to perform a random access method, comprising:

determining a first signal related parameter based on terminal identifier related information; and sending a first signal based on the first signal related parameter, wherein:

the first signal comprises at least one of a Sounding Reference Signal (SRS) or a preamble of a first random access message, and the first signal related parameter comprises at least one of the following:

sequence identification information of the first signal;

a time domain resource for the first signal; or a frequency domain resource for the first signal, wherein when the first signal is the preamble of the first random access message, determining the first signal related parameter based on the terminal identifier related information comprises:

selecting one preamble from at least one preamble corresponding to a Random access channel Occasion (RO) based on the terminal identifier related information, wherein a group identifier of the terminal is associated with a first preamble group identifier, wherein the group identifier of the terminal is obtained based on the terminal identifier related information, and the first preamble group identifier is an identifier of a preamble group in which the selected preamble is located.

* * * * *